(12) United States Patent
Zeulner

(10) Patent No.: US 11,072,113 B2
(45) Date of Patent: Jul. 27, 2021

(54) APPARATUS FOR ADDITIVELY MANUFACTURING THREE-DIMENSIONAL OBJECTS

(71) Applicant: CONCEPT LASER GMBH, Lichtenfels (DE)

(72) Inventor: Fabian Zeulner, Lichtenfels (DE)

(73) Assignee: CONCEPT LASER GMBH, Lichtenfels (DE)

( * ) Notice: Subject to any disclaimer, the term of this patent is extended or adjusted under 35 U.S.C. 154(b) by 7 days.

(21) Appl. No.: 16/273,130

(22) Filed: Feb. 11, 2019

(65) Prior Publication Data

US 2019/0275734 A1      Sep. 12, 2019

(30) Foreign Application Priority Data

Mar. 9, 2018 (EP) .................................... 18161072

(51) Int. Cl.
*B29C 64/129* (2017.01)
*B29C 64/205* (2017.01)
(Continued)

(52) U.S. Cl.
CPC ............ *B29C 64/129* (2017.08); *B22F 10/20* (2021.01); *B23K 26/03* (2013.01); *B29C 64/00* (2017.08);
(Continued)

(58) Field of Classification Search
CPC ... B29C 64/129; B29C 64/153; B29C 64/268; B29C 64/393; B29C 64/135;
(Continued)

(56) References Cited

U.S. PATENT DOCUMENTS 9,959,613 B2      5/2018   Ohno et al.
2002/0144984 A1*  10/2002  Mori ................... B23K 26/244
                                              219/121.64
(Continued)

FOREIGN PATENT DOCUMENTS

DE      102013225108 A1    6/2015
JP      2014/013547 A      1/2014
(Continued)

OTHER PUBLICATIONS

European Search Report Corresponding to Application No. 18161072 dated Sep. 4, 2018.
(Continued)

*Primary Examiner* — Nahida Sultana
(74) *Attorney, Agent, or Firm* — Dority & Manning, P.A.

(57) ABSTRACT

Apparatus (1) for additively manufacturing three-dimensional objects (2) by means of successive layerwise selective irradiation and consolidation of layers of a build material (3) which can be consolidated by means of an energy source (5), wherein a measurement beam source (4, 17) is provided which is adapted to generate a measurement beam (7), wherein a beam guiding unit (20) is provided that is adapted to guide the measurement beam (7) in the build plane (6) in
(Continued)

Figure 1:
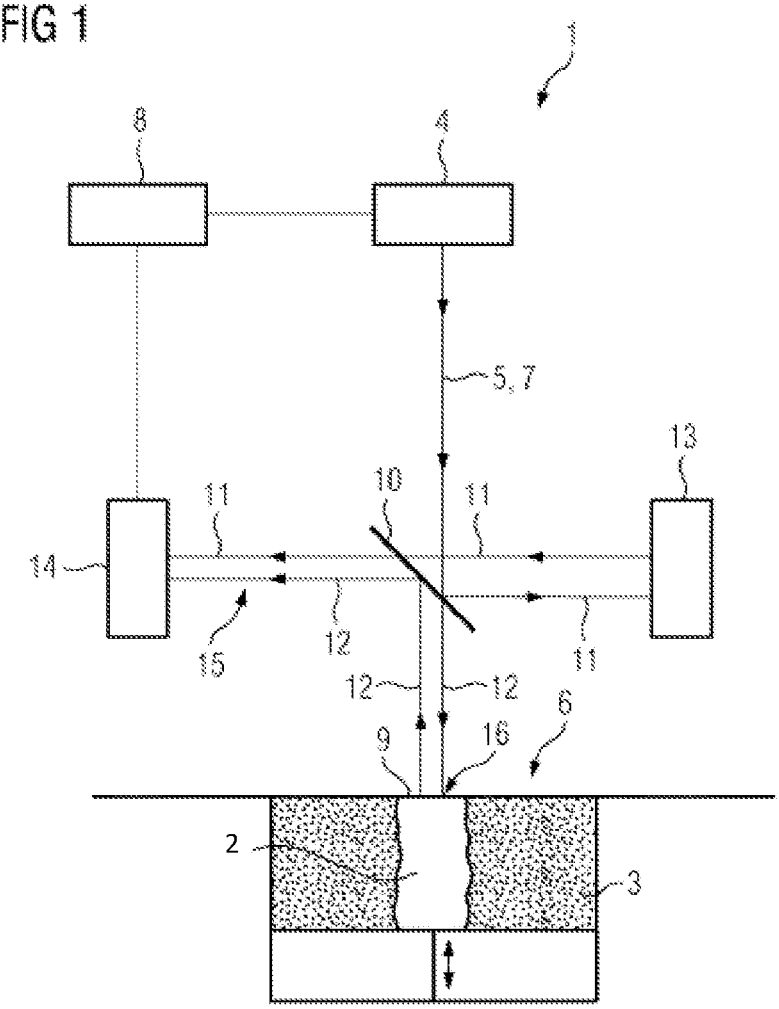

the process chamber, wherein a determination device (8) is adapted to determine at least one parameter relating to the object (2) and/or a build material layer (9) based on interference.

18 Claims, 3 Drawing Sheets

(51) Int. Cl.
*B29C 64/264* (2017.01)
*B29C 64/153* (2017.01)
*B29C 64/268* (2017.01)
*B29C 64/393* (2017.01)
*B29C 64/135* (2017.01)
*B23K 26/03* (2006.01)
*B29C 64/00* (2017.01)
*B22F 10/20* (2021.01)
*B33Y 10/00* (2015.01)
*B33Y 30/00* (2015.01)
*B33Y 50/02* (2015.01)

(52) U.S. Cl.
CPC .......... *B29C 64/135* (2017.08); *B29C 64/153* (2017.08); *B29C 64/205* (2017.08); *B29C 64/264* (2017.08); *B29C 64/268* (2017.08); *B29C 64/393* (2017.08); *B32B 2310/08* (2013.01); *B33Y 10/00* (2014.12); *B33Y 30/00* (2014.12); *B33Y 50/02* (2014.12)

(58) Field of Classification Search
CPC ..... B29C 64/00; B29C 64/264; B29C 64/205; B29C 64/20; B22F 3/1055; B23K 26/03; B33Y 50/02; B33Y 10/00; B33Y 30/00; B32B 2310/08; B28B 1/001
See application file for complete search history.

(56) References Cited

U.S. PATENT DOCUMENTS

| | | | |
|---|---|---|---|
| 2003/0110862 A1* | 6/2003 | Lubatschowski .. | B23K 26/0624 73/644 |
| 2004/0133298 A1* | 7/2004 | Toyserkani ............. | C23C 24/10 700/166 |
| 2006/0157454 A1* | 7/2006 | Larsson ................. | B33Y 10/00 219/121.8 |
| 2013/0068738 A1* | 3/2013 | Schurmann ........... | B23K 26/03 219/121.72 |
| 2016/0059347 A1* | 3/2016 | Kogel-Hollacher ........................ B23K 26/046 219/121.74 |
| 2016/0082668 A1 | 3/2016 | Perret et al. | |
| 2017/0266727 A1 | 9/2017 | Nishino et al. | |
| 2018/0154443 A1* | 6/2018 | Milshtein ............... | B23K 26/10 |
| 2018/0186082 A1* | 7/2018 | Randhawa ............. | B33Y 50/02 |
| 2019/0091798 A1* | 3/2019 | Schonleber ............ | B23K 26/21 |
| 2020/0180023 A1* | 6/2020 | Narita ................... | B33Y 10/00 |

FOREIGN PATENT DOCUMENTS

| | | |
|---|---|---|
| JP | 2016/060063 A | 4/2016 |
| WO | WO2016/151712 A1 | 9/2016 |
| WO | 2017207711 A1 | 12/2017 |

OTHER PUBLICATIONS

Machine Translated Japanese Search Report Corresponding to Application No. 2019025285 dated Jan. 29, 2020.
Machine Translated Japanese Office Action Corresponding to Application No. dated Feb. 14, 2020.

* cited by examiner

APPARATUS FOR ADDITIVELY MANUFACTURING THREE-DIMENSIONAL OBJECTS

CROSS-REFERENCE TO RELATED APPLICATIONS

This application claims priority to European Patent Application serial no. 18 161 072.6 filed Mar. 9, 2018, the contents of which is incorporated herein by reference in its entirety as if set forth verbatim.

The invention relates to an apparatus for additively manufacturing three-dimensional objects by means of successive layerwise selective irradiation and consolidation of layers of a build material which can be consolidated by means of an energy source, wherein a determination device is provided for determining at least one parameter of radiation inside a process chamber of the apparatus.

Apparatuses for additively manufacturing three-dimensional objects with an energy source that is used to selectively irradiate and consolidate layers of a build material in a successive layerwise manner are generally known from prior art. Such apparatuses may comprise determination devices that are adapted to generate information about radiation propagating inside the process chamber, i.e. the chamber in which the additive manufacturing process is performed. Thus, it is possible to provide information relating to the energy source and/or radiation that is emitted from a powder bed, such as thermal radiation.

Further, it is known from prior art that positioning the object accurately is crucial for the process quality and/or the object quality, as misalignments or errors in the position of the object or the powder bed, respectively, may lead to deviations from the nominal position of the irradiation pattern on the build material and therefore, may cause imperfections in the additively built object. Thus, it is known to accurately manufacture and guide carrying elements that carry the powder bed. However, it is not possible to detect whether a relative movement between the object and the powder bed occurs. Additionally, it is not possible to determine specific information about the meltpool and already consolidated regions of build material in a so-called build plane or below the build plane.

It is an object of the present invention to provide an apparatus for additively manufacturing three-dimensional objects, wherein the determination of information relating to the additive manufacturing process is improved.

The object is inventively achieved by an apparatus according to claim 1. Advantageous embodiments of the invention are subject to the dependent claims.

The apparatus described herein is an apparatus for additively manufacturing three-dimensional objects, e.g. technical components, by means of successive selective layerwise consolidation of layers of a powdered build material ("build material") which can be consolidated by means of an energy source, e.g. an energy beam, in particular a laser beam or an electron beam. A respective build material can be a metal, ceramic or polymer powder. A respective energy beam can be a laser beam or an electron beam. A respective apparatus can be an apparatus in which an application of build material and a consolidation of build material is performed separately, such as a selective laser sintering apparatus, a selective laser melting apparatus or a selective electron beam melting apparatus, for instance. Alternatively, the successive layerwise selective consolidation of build material may be performed via at least one binding material. The binding material may be applied with a corresponding application unit and, for example, irradiated with a suitable energy source, e.g. a UV light source.

The apparatus may comprise a number of functional units which are used during its operation. Exemplary functional units are a process chamber, an irradiation device which is adapted to selectively irradiate a build material layer disposed in the process chamber with at least one energy beam, and a stream generating device which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

The invention is based on the idea that a measurement beam source is provided which is adapted to generate a measurement beam, wherein a beam guiding unit is provided that is adapted to guide the measurement beam in the build plane in the process chamber, wherein the determination device is adapted to determine at least one parameter relating to the object and/or the build material layer based on (optical) interference. Thus, a measurement beam source is inventively provided, wherein any beam source can be used that is adapted to generate a beam that can be used as measurement beam, for example an energy beam, such as a laser beam. Thus, it is particularly possible that as measurement beam source the energy source of the additive manufacturing apparatus is used, for example a laser beam source. Besides, it is also possible to provide a separate measurement beam source.

The measurement beam that is generated via the measurement beam source is guided via a beam guiding unit, for example a (moveable) mirror or a scanner, onto a build plane in the process chamber. As described before, the build plane is a plane inside the process chamber in which an (uppermost) layer of build material is arranged that is to be irradiated via the energy source. Of course, the measurement beam may be guided onto the build plane, wherein a relative movement between the measurement beam (the spot of the measurement beam) and the build plane is generated via a movement of the build plane, e.g. the carrying element carrying the powder bed.

The determination device of the inventive apparatus is adapted to determine at least one parameter relating to the object and/or the build material layer based on interference. Thus, an optical interference pattern is generated via the measurement beam, wherein information can be generated based on the interference pattern, in particular based on the determination of changes of the interference pattern. The term "interference" is typically to be understood as optical interference in the scope of this application, i.e. a superposition of light waves, namely the reference part and the measurement part, leads to a resultant interference pattern (on the detector). For example, the measurement beam being split into the reference part and the measurement part which are superposed on the detector are coherent with each other, as they come from the same source. Therefore, an interference pattern can be observed.

The terms "build material layer" may in particular comprise non-consolidated build material arranged in a build plane to be selectively irradiated with the energy beam. The term "object" may refer to any at least partially irradiated build material, such as a consolidated layer of build material, the meltpool or a support structure that is additively built in the manufacturing process. Thus, the at least one parameter may be determined relating to irradiated and non-irradiated build material in the build plane, in particular consolidated, partially consolidated and non-consolidated build material.

Thus, it is possible to derive height information of the at least one part of the build plane the measurement beam is guided to. Therefore, it is possible to directly derive information from the additive manufacturing process such as height information of a respective region of the build plane, wherein conclusions can be drawn to the process quality and/or the object quality. For example, variations in the height of the build plane and the meltpool can be taken into calculation for gaining information relating to a stability of the melting process. Further, height information may be generated relating to the object, in particular to a consolidated zone of the object, wherein deviations from a nominal height information may be identified. Thus, it is possible to verify, whether (at least one consolidated layer of) the object meets geometrical requirements, for instance.

Further, it is not only possible to generate information relating to the uppermost layer of build material, but it is also possible to generate information relating to previously applied and consolidated layers of build material. By generating information about previously applied and consolidated layers of build material it is possible to verify that defined requirements regarding the object quality and/or the process quality are met, e.g. in terms of the consolidation behavior, the (mechanical) structure or other physical parameters. Hence, the determination device is adapted to determine at least one parameter relating to at least one previously applied layer of build material, in particular to determine at least one parameter relating to multiple previously applied layers of build material based on interference.

According to an embodiment of the inventive apparatus, a beam splitter may be provided that is adapted to split the measurement beam in a reference part and a measurement part, wherein the beam splitter may further be adapted to guide the reference part to a reference mirror and the measurement part to the build plane, wherein the beam splitter may further be adapted to combine the reference part reflected at the reference mirror and the measurement part reflected at the build plane and guide the combined part towards a detector unit. Hence, the measurement beam that is generated via the measurement beam source, as described before, for example a separate measurement beam source or the energy source generating the energy beam, is split into two parts, namely the measurement part and the reference part. The reference part is guided to a reference mirror at which it is reflected and guided back towards the beam splitter. Analogously, the measurement part is guided to the build plane wherein the measurement part is incident on the layer of build material arranged in the build plane (and wherein build material is irradiated with the measurement part, if the energy beam is used as measurement beam) and is (at least partially) reflected at the build plane. The reflected measurement part is guided back towards the beam splitter, wherein the reflected measurement part and the reflected reference part are guided through the beam splitter in that they are incident on a detector unit. The reflected parts, namely the reflected measurement part and the reflected reference part propagating from the beam splitter towards the detector may be deemed as "combined part".

As the measurement part and the reference part are generated by splitting the measurement beam, dependent (inter alia) on the beam path difference between the measurement part and the reference part, an optical interference pattern is generated on the detector unit. Hence, the interference pattern and/or changes in the interference pattern can be monitored to determine the at least one parameter relating to the object and/or a build material layer.

The beam guiding unit may be adapted to guide the measurement beam and the energy beam inline and/or confocal. Thus, as described before, it is possible to provide a separate measurement beam source which is separate to the energy source that generates the energy beam used for irradiating the build material in the additive manufacturing process. Thus, according to this embodiment, the measurement beam is exclusively used to generate information about the additive manufacturing process, in particular to allow for the determination device to determine the at least one parameter, as described before.

The measurement beam may be coupled into the beam path of the energy beam (or vice versa) in that the energy beam and the measurement beam are guided inline and/or confocally. Hence, the measurement beam and the energy beam being incident on the beam guiding unit can be moved synchronously. This allows for determining the at least one parameter synchronously with irradiating the build material. Of course, a spatial offset can be defined, wherein the measurement beam is positioned in a defined distance in the build plane relative to the energy beam. In other words, the spot of the measurement beam and the spot of the energy beam in the build plane may be positioned in a defined distance. As the beam guiding unit according to this embodiment, for example a scanner unit, such as an x- and y-scanner, is adapted to guide the energy beam and the measurement beam, both, the measurement beam and the energy beam are guided synchronously in the build plane. Of course, it is also possible to guide the energy beam and the measurement beam separately.

According to another embodiment of the inventive apparatus, at least one movement unit may be provided, preferably a wobble unit, in particular a wobble mirror, that is adapted to move the measurement part across the build plane, in particular relative to the energy beam guided onto the build material layer to selectively irradiate the build material layer. Thus, the movement generated via the movement unit may overlay the guiding of the measurement part in the build plane that is performed via the beam guiding unit. In other words, the measurement part may be guided in the build plane via the beam guiding unit, wherein the measurement part may also be guided in the build plane via the movement unit.

Thus, the resulting movement of the measurement part in the build plane is composed of a movement generated by the beam guiding unit and a movement generated by the movement unit. As the movement that is generated via the beam guiding unit causes the measurement part or the spot thereof to synchronously move with the energy beam, it is advantageous to use the movement generated by the movement unit to move the measurement part relative to the energy beam, as the movement unit is adapted to move the measurement part individually. Thus, it is possible to move the measurement part independent to the energy beam, e.g. define a distance (offset) between the spots of the measurement part and the energy beam. Alternatively or additionally, it is possible to arbitrarily guide the measurement part, in particular (linearly) across the build plane and/or relative to the energy beam, e.g. in an arbitrary movement pattern.

In particular, it is possible to move the measurement part preceding or succeeding relative to the energy beam, i.e. moving the measurement part back-and-forth with respect to the actual energy beam position in the build plane. Of course, any arbitrary movement pattern is feasible such as an arbitrary movement of the spot of the measurement part in the x- and y-plane, in particular the build plane, relative to the position of the energy beam.

Also, the distance between the spots of the measurement part and the energy beam can be adjusted and changed via the movement unit. It is also possible that the movement unit generates a wobble movement of the measurement part wobbling around the position of the energy beam in the build plane. Preferably, the movement unit is arranged outside the beam path of the energy beam allowing for generating the movement, in particular the relative movement, of the measurement part in advance to coupling the measurement part into the beam path of the energy beam. As described before, it is also possible to completely separate the beam paths of the energy beam and the measurement part.

The movement unit may further be adapted to guide the measurement part in at least one region of the build plane that is preceding an energy beam path, in particular for determining at least one parameter relating to an application of build material and/or position information of the build plane preceding the energy beam path. Thus, it is possible that the measurement part is guided over the build plane in advance to the energy beam that follows the energy beam path (for example defined by the irradiation pattern). Hence, information about the build plane that lies in front of the energy beam can be generated. For example, the height information of the build plane before the energy beam path, in particular before the actual position of the energy beam in the build plane, can be generated. Thus, it is possible to gain information regarding the surface quality of the build material arranged in the build plane, in particular the quality of the uppermost surface of build material, e.g. in terms of application quality. For example, if the application of build material was not properly performed, the measurement part may generate information relating to uneven height information in the build plane. If the build material application has been performed properly, the height information relates to an even distribution of build material in the build plane and therefore, to even height information.

Besides, it is also possible to determine height information of the build material or the object preceding the actual position of the energy beam in the build plane. For example, movements of the object in the powder bed (volume of non-consolidated build material the object is received in during the additive manufacturing process) can be identified, in particular relative movements of the object inside the powder chamber, in particular in the powder bed.

According to another embodiment of the inventive apparatus, the movement unit may be adapted to guide the measurement part in at least one region of the build plane that is succeeding, i.e. following, an energy beam path, in particular for determining at least one parameter relating to a consolidation behavior of at least one irradiated area of build material and/or a position information of the build plane succeeding, i.e. following, the energy beam path. Hence, it is possible to guide the measurement part following the energy beam or following the actual position of the energy beam in the build plane. Hence, the measurement part is guided in a region of the build plane that has previously been irradiated via the energy beam.

In this region it is possible to determine at least one parameter relating to the consolidation behavior of the region or area that has previously been irradiated via the energy beam. By generating information about this area or region it is possible to generate information about the consolidation behavior of the build material that has been irradiated. For example, it is possible to derive, whether the surface of the object (uppermost layer of build material that has been irradiated) meets defined requirements, such as the three-dimensional geometry of the object. Object impurities can be identified, as irregularities in the consolidation behavior of each layer can be determined via the guiding of the measurement part following the actual position of the energy beam path. Thus, the quality of the consolidation of the layer that has been applied and irradiated can be identified.

Besides, it is also possible to generate position information of the build plane that is succeeding the energy beam path. Hence, the position information may relate to a position of at least one layer that has previously been irradiated and therefore, consolidated, in particular consolidated with at least one previously applied and consolidated layer of build material. The position information again, may also relate to relative movements or deviations from a nominal position of the object in the powder bed.

Further, the movement unit may be adapted to guide the measurement part in at least one region of the build plane that is congruent with an actual position of the energy beam, in particular for determining at least one parameter relating to a melting behavior of build material and/or position information of the build plane in the meltpool. The term "meltpool" may refer to the area or region in the build plane that is directly irradiated via the energy beam to melt the build material. By guiding the measurement part synchronously with the energy beam or guiding the measurement part to the position of the energy beam in the build plane, it is possible to derive information directly related to the actual consolidation process of build material in the build plane.

In particular it is possible to determine at least one parameter relating to the melting behavior of the build material. For example, it is possible to derive height information of the meltpool, wherein stable height information may indicate a stable melting process of build material. Otherwise, variances in the derived information may indicate instabilities in the consolidation behavior in the meltpool.

The movement unit may particularly be adapted to guide the measurement beam, in particular the measurement part, in an endless movement pattern in the build plane, preferably a loop, in particular an eight-like shaped loop. As described before, the movement of the measurement part in the build plane may be arbitrarily composed of any movement, for example synchronous with and/or relative to the position of the energy beam in the build plane. Preferably, the movement pattern covers all areas of movement, as described before, in particular an area or region preceding to the actual position of the energy beam, an area or region succeeding the actual position of the energy beam and an area or region in the actual position of the energy beam.

Of course, the movement pattern, in particular the endless movement loop can be extended to an arbitrary distance relative to the energy beam, covering an area or region in the x- and y-plane, in particular the build plane, as is deemed suitable. It is particularly preferred that the loop shape is performed as eight-like shaped loop, wherein the measurement part is guided through the actual position of the energy beam in the build plane twice each turn, as the two loops of the eight-like shaped loop are connected in the center of the eight-like shape.

The determination device of the inventive apparatus may further be adapted to generate height information of the corresponding part of the build plane based on changes of the optical interference pattern on the detector unit, in particular counting interference stripes and periodic crossovers. Thus, by moving the measurement part in the build plane, the optical beam path of the reference part and the measurement part may differ. Of course, it has to be taken into calculation that the measurement part will comprise an optical beam path difference by guiding the measurement part to different positions in the build plane, wherein this beam path offset may be taken into calculation and may be properly compensated. Hence, the resulting beam path difference or changes in the beam path difference indicate that the point at which the measurement part is reflected changes relative to a nominal position. Hence, by monitoring the interference pattern, in particular counting interference stripes and periodic crossovers, it is possible to determine the height information of the corresponding part of the build plane. For example, if the build plane is perfectly even, (and path length differences due to the movement of the measurement part have been compensated) the interference pattern will remain constant and will not change. Thus, changes of the interference pattern can be used to indicate inequalities in the build plane. Of course, it is also possible to compensate the effect of the movement of the measurement part to different positions after the determination/generation of the interference pattern.

The measurement beam source may be adapted to generate a coherent measurement beam, preferably a laser beam with a wavelength differing from the energy source, in particular the energy beam, and/or an incoherent measurement beam, preferably a white light beam. The terms "coherent" and "incoherent" may also be understood as referring to coherent light sources and incoherent light sources. For example a laser beam may be understood as coherent light source in the scope of this application, wherein a white light source may be deemed as incoherent light source. Using a coherent measurement beam has the advantage that components of the apparatus may be adapted to both the wavelength of the energy beam and the wavelength of the measurement beam, wherein it is advantageously possible to adapt respective optical components to be especially transmissive for those wavelengths. For example, antireflection coatings or optical filters may be adapted to transmit the measurement beam and the energy beam. Using an incoherent measurement beam has the advantage that absolute height information may be generated.

According to another embodiment of the inventive apparatus, the movement unit may comprise at least two moving elements, in particular mirrors, wherein at least one mirror is adapted to move the measurement part in at least one direction in the build plane. Thus, it is possible to have at least two moving (moveable) elements, wherein e.g. at least one mirror is movable to move the measurement part in at least one direction in the build plane. By having at least two moving elements a particularly compact set up may be realized. The moving elements may for example be built as a galvo- (Galvanometer) mirrors.

The inventive apparatus may further be improved in that the determination device may be adapted to determine the position of the beam guiding unit in the process chamber. By generating height information that can be used as absolute height information, for example relative to a nominal position, it is possible to determine the position of the beam guiding unit in the process chamber. For example, misalignments or deviations from a nominal position of the beam guiding unit can be identified and properly compensated. For example, an incoherent light source can be used to provide absolute height information that can be used to calibrate the position of the beam guiding unit.

The measurement beam source may further be adapted to generate at least two measurement beams, wherein the at least two measurement beams can be guided separately, in particular by different movement units, or synchronously.

Thus, it is possible to have different measurement beam sources that generate at least two different measurement beams or that at least one measurement beam source is adapted to generate at least one measurement beam. The two measurement beams may be guided to different regions or areas of the build plane to generate information about the build material arranged in this specific region or area of the build plane. Of course, it is possible to move the at least two measurement beams synchronously, for example synchronous with the energy beam, for example in a defined distance to the energy beam. It is also possible to move each of the measurement beams separately, for example by assigning different movement units to the different measurement beams. Hence, it is possible to move each measurement part of the at least two measurement beams separately and individually in the build plane, i.e. in the x- and y-plane.

Besides the invention relates to a determination device for an apparatus for additively manufacturing of three-dimensional objects by means of successive layerwise selective irradiation and consolidation of layers of a build material which can be consolidated by means of an energy beam, in particular an inventive apparatus, as described before, comprising a determination device for determining at least one parameter of radiation inside a process chamber of the apparatus, wherein a measurement beam source which is adapted to generate a measurement beam, wherein a beam guiding unit is provided that is adapted to guide the measurement beam in the build plane in the process chamber, wherein the determination device is adapted to determine at least one parameter relating to the object and/or the build material layer based on interference.

Further, the invention relates to a method for operating an apparatus for additively manufacturing of three-dimensional objects by means of successive layerwise selective irradiation and consolidation of layers of a build material which can be consolidated by means of an energy beam, in particular an inventive apparatus, as described before, wherein a determination device is provided for determining at least one parameter of radiation inside a process chamber of the apparatus, wherein a measurement beam is generated via a measurement beam source, wherein the measurement beam is guided in the build plane in the process chamber, wherein at least one parameter relating to the object and/or the build material layer is determined based on interference.

Self-evidently, all details, features and advantages described with respect to the inventive apparatus are fully transferable to the inventive irradiation device and the inventive method. Of course, the inventive method may be performed on the inventive apparatus, preferably using an inventive irradiation device.

Figure 2:
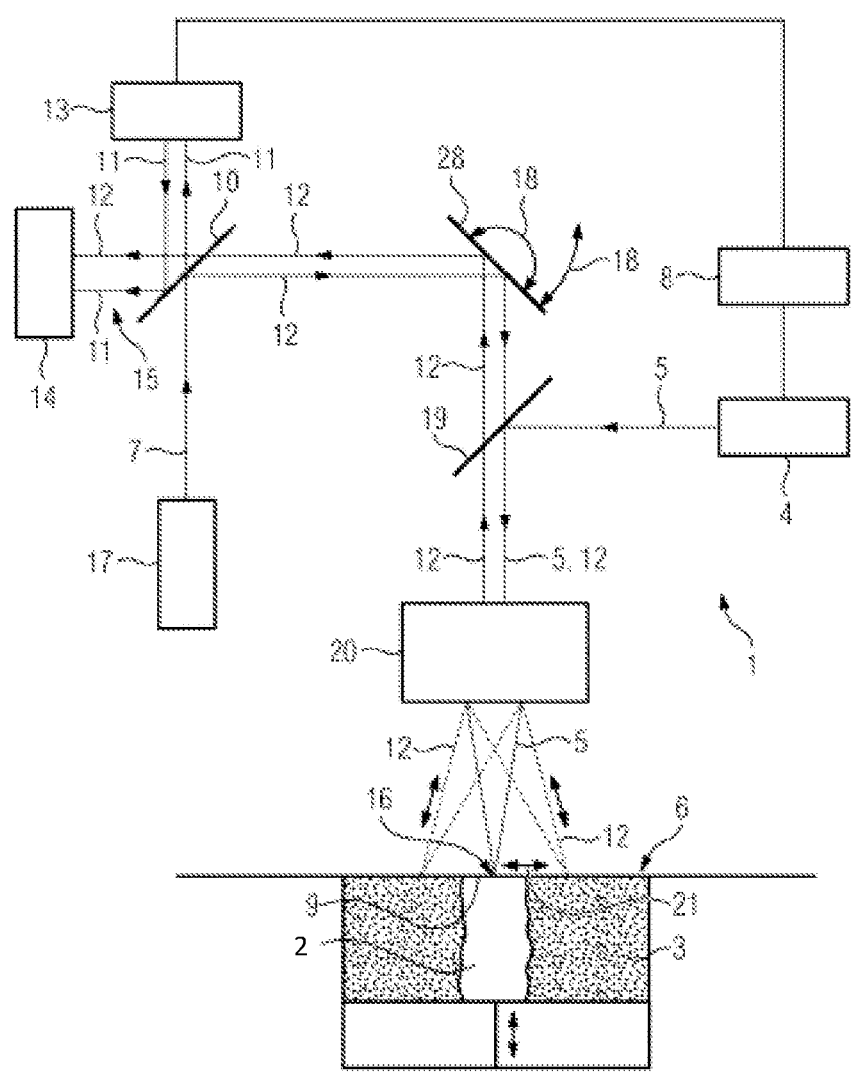

Exemplary embodiments of the invention are described with reference to the Fig. The Fig. are schematic diagrams, wherein FIG. 1 shows an inventive apparatus according to a first embodiment;

FIG. 2 shows an inventive apparatus according to a second embodiment;

and

Figure 3:
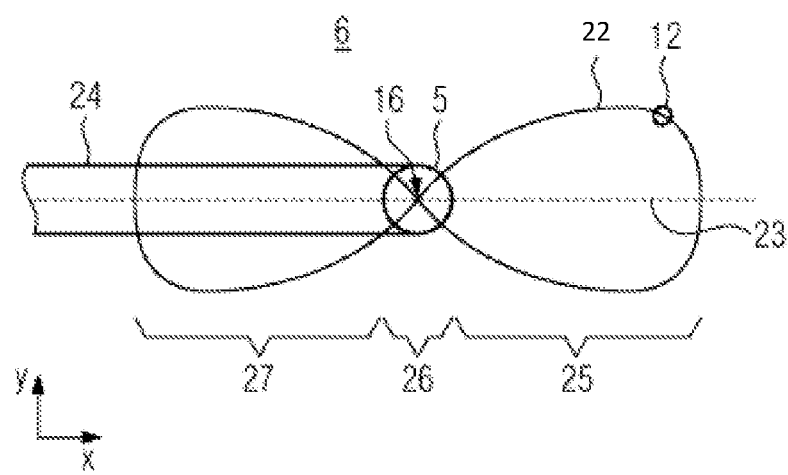

FIG. 3 shows an exemplary path of a measurement beam in the build plane.

FIG. 1 shows an apparatus 1 for additively manufacturing three-dimensional objects 2 by means of successive layerwise selective irradiation and consolidation of layers of a build material 3 which can be consolidated by means of an energy source. An irradiation device 4 is provided, that is adapted to generate an energy beam 5, such as a laser beam. The irradiation device 4 comprises a beam guiding unit (not shown in FIG. 1) that is adapted to move the energy beam 5 in the build plane 6, in particular over a surface of build material 3 arranged in the build plane 6. The energy beam 5 is used as "writing" energy beam 5 to irradiate the build material 3, and the energy beam 5 is also used as measurement beam 7. Thus, the irradiation device 4 may also be deemed as measurement beam source in this exemplary embodiment, as depicted in FIG. 1.

The apparatus 1 further comprises a determination device 8 that is adapted to determine at least one parameter relating to the object 2 and/or a build material layer 9, for example arranged in the build plane 6 or a previously applied and irradiated layer 9 of build material 3.

The energy beam 5 that is used as measurement beam 7 in the exemplary embodiment, as depicted in FIG. 1, is incident on a beam splitter 10 that is adapted to split the energy beam 5 or the measurement beam 7, respectively, into a reference part 11 and a measurement part 12. In the following reference is made only to the energy beam 5, wherein it has to be understood that the energy beam 5 is used as measurement beam 7 in this exemplary embodiment. Thus, all details, features and advantages described with respect to the energy beam 5 are fully transferable to the measurement beam 7, as the energy beam 5 is used as measurement beam 7 or the energy beam 5 and the measurement beam 7 are identical in this embodiment.

In other words, the energy beam 5 is at least partially reflected at the beam splitter 10, which part of the energy beam 5 is deemed as reference part 11. The reference part 11 is reflected at a reference mirror 13, wherein the reflected reference part 11 is again guided towards the beam splitter 10 and passes the beam splitter 10 and is guided towards a detector unit 14. The part of the energy beam 5 that is incident on the beam splitter 10 and is transmitted through the beam splitter 10 is deemed as measurement part 12 and is guided onto the build plane 6, in particular onto the layer 9 of (non-consolidated) build material 3 arranged in the build plane 6. The measurement part 12 is (partially) reflected at the surface of build material 3 and is guided towards the beam splitter 10, wherein it is reflected towards the detector unit 14. Thus, the reference part 11 and the measurement part 12 that propagate from the beam splitter 10 towards the detector unit 14 can be deemed as combined part 15, wherein the beam splitter 10 can be deemed as being adapted to combine the reflected reference part 11 and the reflected measurement part 12 to guide both parts 11, 12 towards the detector unit 14.

The detector unit 14 receives both, the reference part 11 and the measurement part 12, wherein an interference pattern is generated on the detector unit 14 (inter alia) dependent on the optical path difference of the parts 11, 12. The detector unit 14 may comprise at least one detector element (not shown) that can, for example, be built as or comprise at least one CCD sensor and/or at least one CMOS sensor, such as a camera.

The interference pattern that is generated on the detector unit 14 allows for determining parameters relating to the object 2 and/or the build material layer 9. For example, variances in the interference pattern indicate that the beam path difference between the reference part 11 and the measurement part 12 occur or change, respectively. In particular, it is possible (for example via a corresponding control unit) to compensate occurring optical beam path differences due to the energy beam 5 being guided to different positions in the build plane 6. As those beam path differences may be taken into calculation and may be compensated, variances in the interference pattern relate to inequalities of the build material layer 9. In other words, if the layer 9 in the build plane 6 is even and homogenous the interference pattern on the detector unit 14 will remain constant (except influences due to the energy beam 5 being guided to different positions in the build plane 6).

Hence, the stability of the interference pattern may be related to the stability of the additive manufacturing process, in particular the stability of a meltpool 16 that is generated via the irradiation of build material 3 with the energy beam 5 in the build plane 6. For example, if the interference pattern is stable, the meltpool 16 that is generated via the energy beam 5 can also be regarded as being stable. If changes in the interference pattern occur, an instability of the additive manufacturing process, in particular the generation of the meltpool 16, may be indicated.

As the energy beam 5 and the measurement part 12 that is reflected at the build plane 6 are synchronously guided in the build plane 6 via the beam guiding unit (not shown), the meltpool 16 can be monitored during the additive manufacturing process.

FIG. 2 shows an apparatus 1 for additively manufacturing three-dimensional objects 2 according to a second embodiment. As the setup of the apparatus 1 depicted in FIG. 2 is generally based on the setup of the apparatus 1 as depicted in FIG. 1, the same numerals are used for the same components. In particular, the apparatus 1, as depicted in FIG. 2, also comprises an irradiation device 4 generating an energy beam 5, the build plane 6 in which an object 2 can be built from non-consolidated build material 3, a determination device 8, a detector unit 14, a reference mirror 13 and a beam splitter 10.

Deviant from the apparatus 1 as depicted in FIG. 1, the apparatus 1 as depicted in FIG. 2 comprises a separate measurement beam source 17. In other words, the energy beam 5 that is generated via the irradiation device 4 is not used as measurement beam 7 in the second embodiment, as depicted in FIG. 2. Instead, the measurement beam 7 is separately generated via the measurement beam source 17. The measurement beam 7 is guided towards the beam splitter 10, which splits the measurement beam 7 into the reference part 11 and the measurement part 12, as described before. Again, the reference part 11 is transmitted through the beam splitter 10 and is reflected at the reference mirror 13 from which it is reflected and again guided towards the beam splitter 10. The reference part 11 is then reflected at the beam splitter 10 and guided towards the detector unit 14.

The measurement part 12 is reflected (and thereby split of the measurement beam 7) at the beam splitter 10 and is guided towards the build plane 6. On its way to the build plane 6, the measurement part 12 is incident on a movement unit 28, for example a movable mirror (as indicated via arrow 18), in particular a galvanometer mirror. The measurement part 12 is reflected at the movement unit 28 and therefore, guided towards the build plane 6. The measurement part 12 that is reflected at the movement unit 28 passes through another mirror 19 and is incident in the beam guiding unit 20.

The irradiation device 4 of the apparatus 1, as depicted in FIG. 2, is adapted to generate the energy beam 5, which is also incident on the mirror 19. The energy beam 5 is reflected at the mirror 19 and is therefore, also guided towards the beam guiding unit 20. The beam guiding unit 20 is adapted to guide the energy beam 5 and the measurement part 12 in the build plane 6, wherein it is possible that the measurement part 12 and the energy beam 5 are guided synchronously. It is also possible that dependent on a position and a movement of the movement unit 28, the measurement part 12 is moved relative to the energy beam 5, for example a preceding movement, a succeeding movement or a congruent movement or any arbitrary combination of those movements. It is also possible to define and adjust/change a distance 21 by which the measurement part 12 is positioned away from the energy beam 5.

Subsequently, the measurement beam 12 incident on the build plane 6, is reflected at the build material 3 arranged in the build plane 6, in particular at the layer 9 of build material 3. The reflected measurement part 12 passes the beam guiding unit 20 and is transmitted through the mirror 19. After passing the mirror 19, the reflected measurement part 12 is again incident on the movement unit 28 from which it is reflected and guided through the beam splitter 10 onto the detector 14. Again, the reflected reference part 11 and the reflected measurement part 12 can be deemed as combined part 15, which propagates from the beam splitter 10 to the detector unit 14.

As described before, an irradiation pattern is generated on the detector unit 14, in particular on the detector element of the detector unit 14, based on interference of the reference part 11 and the measurement part 12 on the detector element. Hence, due to the optical beam path difference between the reference part 11 and the measurement part 12 the determination device 8 is adapted to determine at least one parameter relating to the object 2 and/or a build material layer 9, as already described before.

With the set-up, as depicted in FIG. 2, it is possible that the measurement part 12 is moved relative to the energy beam 5 in the build plane 6. It is, for example, possible to move the measurement part 12 in advance to the energy beam 5 or following the energy beam 5. It is also possible to move the measurement part 12 in an endless loop around and/or through the position of the energy beam 5 in the build plane 6 while the energy beam 5 is moved across the build plane 6 to irradiate the build material 3 and thereby consolidate the build material 3 to form the three-dimensional object 2.

FIG. 3 shows an exemplary path of a measurement part 12 in the build plane 6. In the exemplary embodiment, as depicted in FIG. 3, the measurement part 12 is guided along an endless loop 22 that extends in the x- and y-plane, as depicted via arrows. The energy beam 5, in particular the spot of the energy beam 5, is guided along an energy beam path 23, wherein build material 3 arranged in the build plane 6 is irradiated thereby generating a melting track 24 behind the actual position of the energy beam 5. In other words, the energy beam 5 melts and thereby consolidates the build material 3 arranged in the build plane 6 as it is guided over the build plane 6.

In this exemplary embodiment the measurement part 12 is moved due to a corresponding movement of the movement unit 28 in a preceding region 25 that is arranged in advance to the actual position of the energy beam 5 and the measurement part 12 is also guided into a region 26 that is congruent with the actual position of the energy beam 5 and the build plane 6 and the endless loop 22 also extends into a succeeding region 27 that follows the actual position of the energy beam 5 and the build plane 6.

Thus, information can be generated relating to the region 25 that lies in advance to the actual position of the energy beam 5, for example information relating to a surface quality of the build material 3 arranged in the build plane 6. Hence, irregularities in the application quality of the build material 3 can be identified by changes in the irradiation pattern that is generated on the detector unit 14. It is also possible to monitor the region 26 that is congruent with the actual position of the energy beam 5 and the build plane 6, i.e. the region in which the meltpool 16 is generated. By guiding the measurement part 12 through the meltpool 16 information can be generated relating to a stability of the meltpool 16.

Thus, if the information or the interference pattern generated on the detector unit 14 is stable in the meltpool 16, a stable melting and consolidation process is indicated. If the interference pattern is not stable or constant on the detector unit 14, problems with the consolidation behavior can be identified.

Also, a succeeding region 27 can be monitored toward, as the endless loop 22 extends in a succeeding region 27 following the energy beam 5. As the melting track 24 partially extends in the succeeding region 27, the measurement part 12 may generate information about the melting track 24, such as the consolidation behavior of build material 3 that has been consolidated via irradiation with the energy beam 5. Thus, height information can be generated for all three regions 25-27, wherein for example position information can be generated about the build material 3 arranged in the build plane 6, for example relating to an object position of the object 2 relative to the powder bed. Further, information can be generated about the consolidation behavior of one or multiple layers 9 of build material 3, in particular melted build material 3 along the melting track 24. Of course, the depicted endless loop 22 is to be understood as merely exemplary, wherein every track the measurement part 12 can be guided along can be used to monitor or the additive manufacturing process. In particular, the measurement part 12 may be moved synchronously and/or relative to the energy beam 5 in any arbitrary direction and/or along any arbitrary path in the x- and y-plane.

Of course, the inventive method can be performed on the inventive apparatus 1, preferably using an inventive irradiation device 4. In particular, the measurement beam source 17 can be deemed as integral part of the irradiation device 4, wherein the irradiation device 4 may be adapted to generate the measurement beam 7 and/or the energy beam 5, in particular the irradiation device 4 may generate an energy beam 5 that is simultaneously used as measurement beam 7, as described before with respect to FIG. 1.

The invention claimed is:

1. An apparatus for additively manufacturing three-dimensional objects, the apparatus comprising:
   a process chamber comprising a build plane for building an object via consolidation of layers of a build material by an energy beam;
   a measurement beam source adapted to generate a measurement beam;
   a beam guiding unit adapted to guide the measurement beam in the build plane;
   a determination device adapted to determine at least one parameter relating to the object and/or a build material layer based on an interference; and,
   at least one movement unit adapted to move a measurement part across the build plane relative to the energy beam guided onto the build material layer, wherein the movement unit is adapted to guide the measurement beam in one or more loops in the build plane, and wherein the measurement part further moves with a movement generated by the beam guiding unit.

2. The apparatus of claim 1 further comprising a beam splitter adapted to split the measurement beam into a reference part guided to a reference mirror and a measurement part guided to the build plane.

3. The apparatus of claim 2, wherein the beam splitter further combines the reference part after its reflected from the reference mirror and the measurement part after its reflected from the build plane to form a combined part, and wherein the combined part is guided towards a detector unit.

4. The apparatus of claim 1, wherein the beam guiding unit further guides the energy beam that irradiates the build material inline with the measurement beam.

5. The apparatus of claim 1, wherein the beam guiding unit further guides the energy beam that irradiates the build material confocal with the measurement beam.

6. The apparatus of claim 1, wherein the movement unit comprises a wobble unit.

7. The apparatus of claim 1, wherein the movement unit guides the measurement beam in at least one region of the build plane that is preceding an energy beam path.

8. The apparatus of claim 1, wherein the movement unit guides the measurement beam in at least one region of the build plane that is succeeding an energy beam path.

9. The apparatus of claim 1, wherein the movement unit guides the measurement beam in at least one region of the build plane that is congruent with the energy beam.

10. The apparatus of claim 1, wherein the one or more loops comprises an eight-like shaped loop.

11. The apparatus of claim 1, wherein the determination device generates a height information of a corresponding part of the build plane.

12. The apparatus of claim 1, wherein the measurement beam source generates a coherent measurement beam.

13. The apparatus of claim 1, wherein the measurement beam source generates an incoherent measurement beam.

14. The apparatus of claim 1, wherein the at least one movement unit comprises at least two beam moving elements.

15. The apparatus of claim 14, wherein at least one of the two beam moving elements comprises a mirror.

16. The apparatus of claim 1, wherein the determination device determines a position of the beam guiding unit.

17. The apparatus of claim 1, wherein the measurement beam source generates at least two measurement beams.

18. The apparatus of claim 17, wherein the at least two measurement beams can be guided separately.

* * * * *